(12) United States Patent
Hirata et al.

(10) Patent No.: US 10,095,094 B2
(45) Date of Patent: Oct. 9, 2018

(54) SOLID-STATE LIGHT SOURCE DEVICE

(71) Applicant: Maxell, Ltd., Ibaraki-shi, Osaka (JP)

(72) Inventors: Koji Hirata, Ibaraki (JP); Satoshi Nakayama, Ibaraki (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/300,292

(22) PCT Filed: Apr. 4, 2014

(86) PCT No.: PCT/JP2014/060006
§ 371 (c)(1),
(2) Date: Sep. 29, 2016

(87) PCT Pub. No.: WO2015/151283
PCT Pub. Date: Oct. 8, 2015

(65) Prior Publication Data
US 2017/0146896 A1 May 25, 2017

(51) Int. Cl.
G03B 21/20 (2006.01)
F21V 7/06 (2006.01)
F21V 9/08 (2018.01)
G02B 27/14 (2006.01)
F21Y 115/10 (2016.01)

(52) U.S. Cl.
CPC ............ *G03B 21/2033* (2013.01); *F21V 7/06* (2013.01); *F21V 9/08* (2013.01); *G02B 27/149* (2013.01); *G03B 21/2013* (2013.01); *F21Y 2115/10* (2016.08)

(58) Field of Classification Search
None
See application file for complete search history.

(56) References Cited

U.S. PATENT DOCUMENTS

2004/0120647 A1  6/2004  Sakata et al.
2006/0196944 A1*  9/2006  Maeda ............... G02B 27/0955
                                                   235/462.42
2011/0149591 A1*  6/2011  Smith ................... A61B 3/0008
                                                   362/555

FOREIGN PATENT DOCUMENTS

JP    06-231602 A    8/1994
JP    2004-177721 A  6/2004
JP    2012-089395 A  5/2012

OTHER PUBLICATIONS

International Search Report of PCT/JP2014/060006 dated Jul. 1, 2014.

* cited by examiner

*Primary Examiner* — Britt D Hanley
(74) *Attorney, Agent, or Firm* — Mattingly & Malur, PC

(57) ABSTRACT

A solid-state light source device 1 includes a plurality of light source cells 10, a light combining device 20 combining light emitted from the plurality of light source cells and emitting combined light, and a light reflecting/combining unit 30 reflecting the light emitted from the light source cells and emitting the light to the light combining device. The light combining device 20 has a reflective plane on a surface thereof, has a plurality of columnar-shaped regions divided along emission directions in an interior thereof, and has wavelength selective reflective planes in interfaces between the columnar-shaped regions. The light reflecting/combining unit 30 is configured in a substantially paraboloidal shape having a reflective plane on a surface thereof. Accordingly, light use efficiency is improved, and light of a desired color can be selectively extracted.

7 Claims, 9 Drawing Sheets

F I G. 1
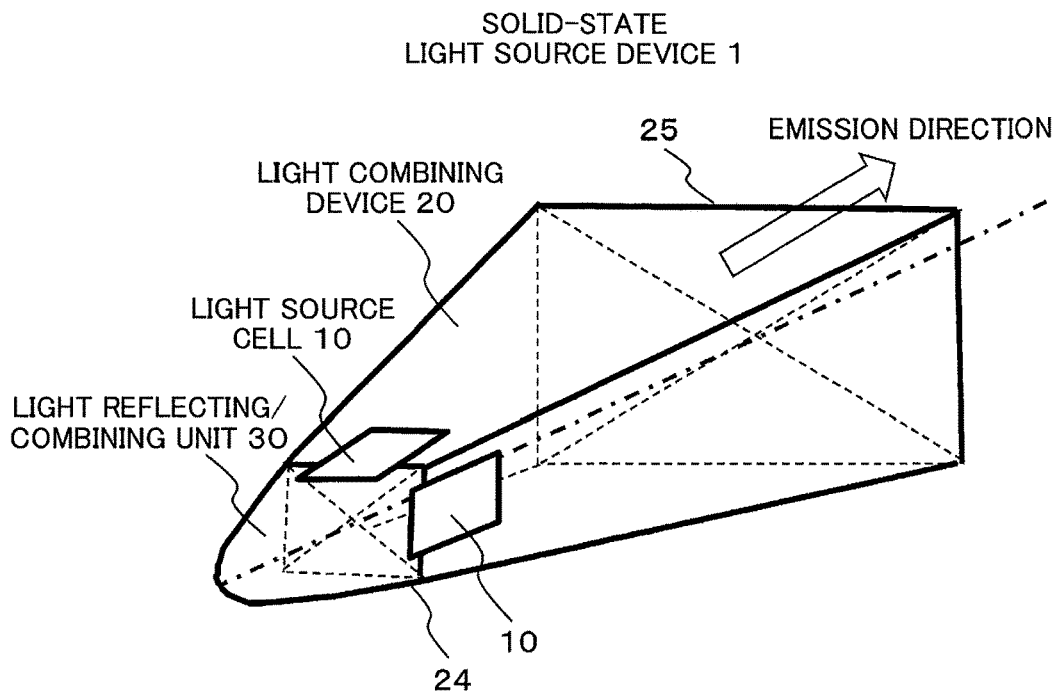
F I G. 2 A
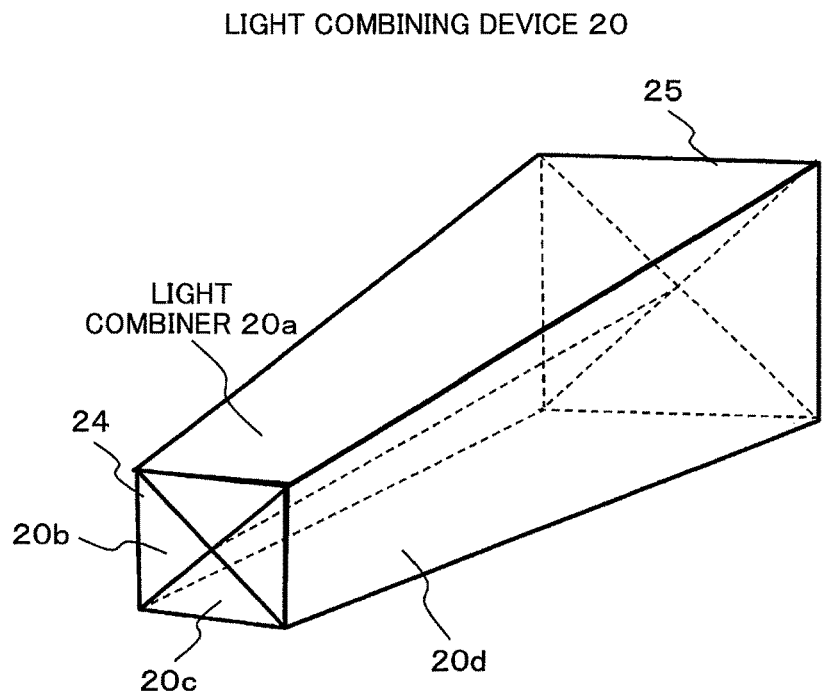

F I G. 3 B
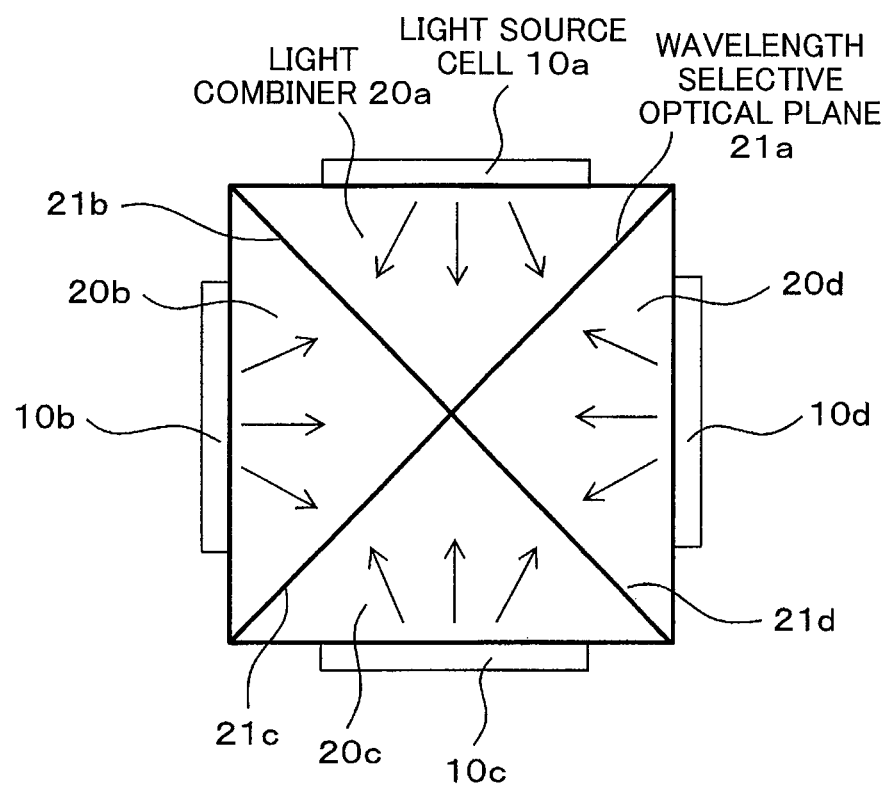

REFLECTION CHARACTERISTICS OF
WAVELENGTH SELECTIVE OPTICAL PLANE 21

(a) G LIGHT REFLECTIVE PLANE (b) B LIGHT REFLECTIVE PLANE (c) R LIGHT REFLECTIVE PLANE

SOLID-STATE LIGHT SOURCE DEVICE

TECHNICAL FIELD

The present invention relates to a solid-state light source device of which light use efficiency is improved.

BACKGROUND ART

In recent years, an LED light source or a laser light source having excellent power consumption efficiency or a long lifecycle has been used as a light source of an image display device or a vehicle lamp which is one of optical application devices. Particularly, the LED light source has been mainly used, because limitation of operation environment (temperature, humidity) is small, and thus, the operation is stabilized in comparison with the laser light source. In the case of obtaining light of a specific color (for example, red, yellow) from the light source, in the related art, by blocking the emitted light from a white light source, that is, the light of the light source by using an exterior part of which surface is coated with a paint containing a pigment or an exterior part containing a pigment to selectively transmit light having a necessary wavelength, light having a desired transmission characteristic has been obtained (refer to, for example, Patent Document 1).

CITATION LIST

Patent Document

Patent Document 1: JP 6-231602 A

SUMMARY OF THE INVENTION

Problem to be Solved by the Invention

A high-power LED light source used for an image display device or a vehicle lamp is generally a surface emitting light source, and in a case where the high-power LED light source is used for an illumination optical system, from the conservation law of etendue (=light emitting area of light source× divergence angle), there is a problem in that efficient light condensing on a light receiving surface (display element unit) cannot be obtained.

In addition, in the related art like Patent Document 1, there are problems to be solved as follows.

(1) Due to light absorption by pigments, light of the light source cannot be effectively used, and thus, light use efficiency is deteriorated.

(2) Even in a case where a light is not turned on (in a non-used state), due to external light absorption by pigments, coloring of an external part occurs, and thus, a design property is greatly deteriorated.

(3) There is a limitation in position relationship between a white light source and a lamp device, and thus, there is a limitation in design.

In consideration of the above-described problem, the present invention is to provide a solid-state light source device having high light use efficiency and having a function of selectively extracting light of a desired color.

Solution to Problem

According to an aspect of the present invention, there is provided a solid-state light source device including: a plurality of light source cells configured with solid-state light sources; and a light combining device combining light emitted from the plurality of light source cells and emitting combined light, wherein the light combining device has a reflective plane on a surface thereof, has a plurality of columnar-shaped regions divided along emission directions in an interior thereof, and has wavelength selective reflective planes in interfaces between the columnar-shaped regions. In addition, the solid-state light source device further includes a light reflecting/combining unit reflecting the light emitted from the light source cells and emitting the light to the light combining device, and light reflecting/combining unit is configured in a substantially paraboloidal shape on a surface thereof.

Effects of the Invention

According to the present invention, it is possible to provide a solid-state light source device having high light use efficiency and having a function of selectively extracting light of a desired color.

BRIEF DESCRIPTION OF THE DRAWINGS

FIG. 1 is a perspective diagram illustrating an entire configuration of a solid-state light source device according to a first embodiment.

FIG. 2A is a perspective diagram illustrating a configuration of a light combining device 20 (light-emitting surface having a shape of a square).

FIG. 3B is a diagram illustrating a cross-sectional configuration of the light combining device 20.

MODE FOR CARRYING OUT THE INVENTION

Figure 2B:
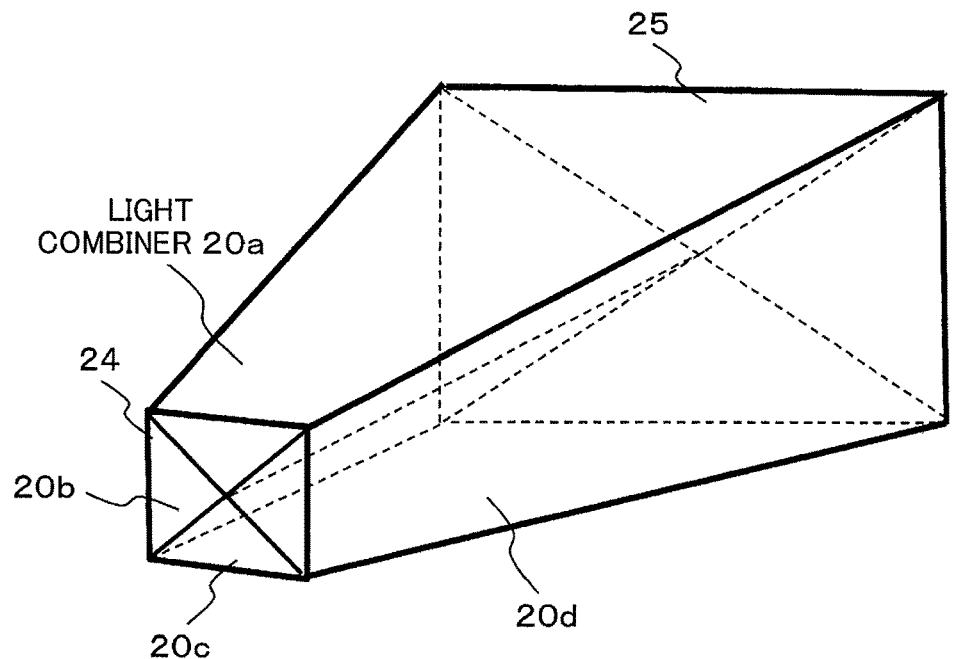
FIG. 2B is a perspective diagram illustrating a configuration of a light combining device 20 (light-emitting surface having a shape of a rectangle).

Hereinafter, embodiments of the present invention will be described with reference to the drawings.

First Embodiment

FIG. 1 is a perspective diagram illustrating an entire configuration of a solid-state light source device according to a first embodiment. A solid-state light source device 1 according to the embodiment is configured to include a light source cell 10, a light combining device 20, and a light reflecting/combining unit 30. The light source cell 10 is configured by arranging an LED light source element, that is, a solid-state light source on a surface thereof, and the light source cells are attached on upper and lower surfaces or both side surfaces of the light combining device 20 or the light reflecting/combining unit 30. The light combining device 20 has a rectangle columnar outer shape having reflective planes on surfaces thereof and has a function of combining light emitted from the light source cells 10 and guiding the combined light in an emission direction. The inner portion of the light combining device 20 is configured with a plurality of columnar-shaped regions divided along an emission direction and has a structure using a dichroic prism as described later. The light reflecting/combining unit 30 is configured in a structure of a shape having a reflective plane on a surface thereof and having an opening toward the light combining device 20, for example, a substantially paraboloidal shape to reflect the light emitted from the light source cells 10. The light combining device 20 and the light reflecting/combining unit 30 are jointed to each other by a jointing surface 24 so that outer shapes (cross-sections) of the two components are continuous to each other. The light emitted from the light source cells 10 is reflected by the substantially paraboloidal reflective plane of the light reflecting/combining unit 30 and is combined by the light combining device 20 to be emitted in an arrow direction from the light-emitting surface 25.

FIGS. 2A and 2B are perspective diagrams illustrating a configuration of the light combining device 20. FIG. 2A illustrates a case where the light-emitting surface 25 has a shape of a square, and FIG. 2B illustrates a case where the light-emitting surface 25 has a shape of a rectangle. The light combining device 20 is configured by assembling four light combiners 20a and 20d. Each of the light combiners 20a to 20d is configured by using a dichroic prism where wavelength selective films are arranged in a cross shape. By appropriately changing a triangular columnar shape, that is, a prism shape of each of the light combiners 20a to 20d, a shape having a desired area or aspect ratio of the light-emitting surface 25 can be obtained. Here, the area of a light-emitting surface 25 is configured to be larger than the area of a jointing surface 24, so that a unique effect capable of allowing a divergence angle of the light reflected multiple times in the light combining device 20 to be small is obtained.

Figure 3A:
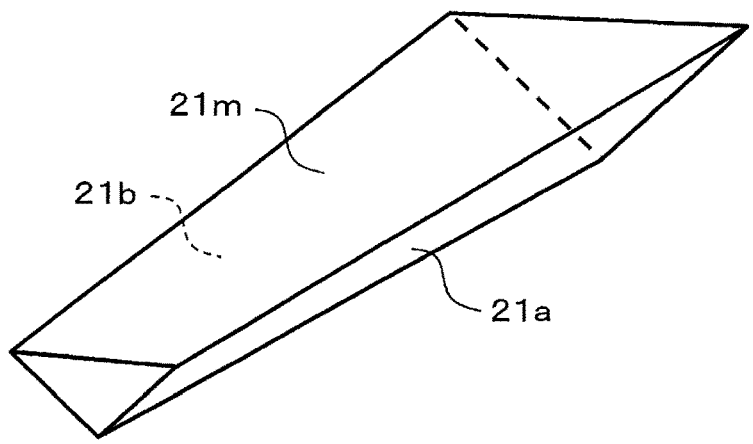
FIG. 3A is a perspective diagram illustrating a shape of one light combiner.

FIG. 3A is a perspective diagram illustrating a shape of one light combiner and illustrates the case of the light combiner 20a of FIG. 2A. The light combiner 20a is a dichroic prism having a triangular columnar shape, and a top surface 21m which becomes a surface of the light combining device 20 is a reflective plane. Other side surfaces 21a and 21b are wavelength selective optical planes having dichroic characteristics.

FIG. 3B is a diagram illustrating a cross-sectional configuration of the light combining device 20. The four light combiners 20a to 20d are assembled to constitute a rectangular outer shape, and outer surfaces of the light combiners are attached with the respective light source cells 10a to 10d. In the interfaces between the light combiners, the wavelength selective optical planes 21a to 21d having dichroic characteristics are arranged. The light emitted from the light source cells 10a to 10d is reflected or transmitted by the wavelength selective optical planes 21a to 21d, so that the light of a desired color can be selectively extracted, or the light of a plurality of colors can be combined.

Figure 4:
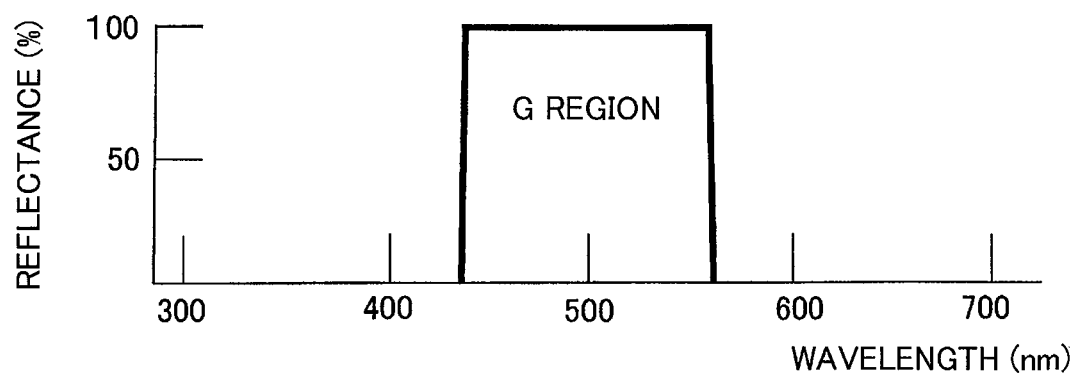
FIG. 4 is a diagram illustrating reflection characteristics of a wavelength selective optical plane 21.
Figure 4:
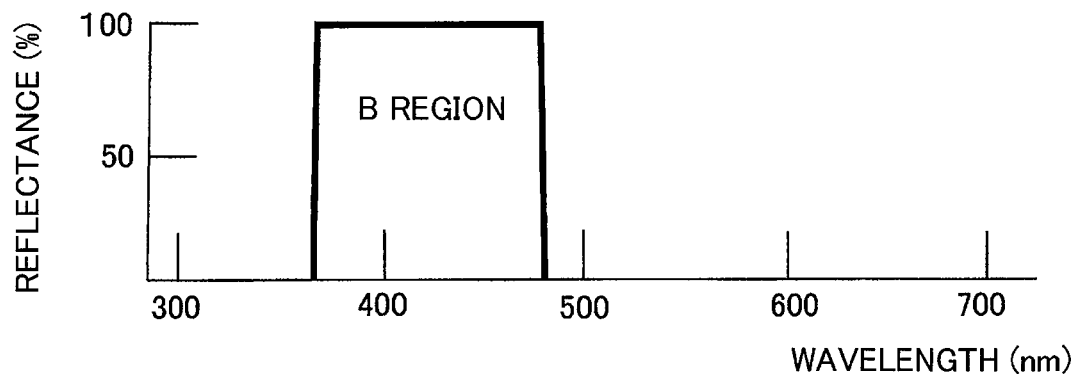
Figure 4:
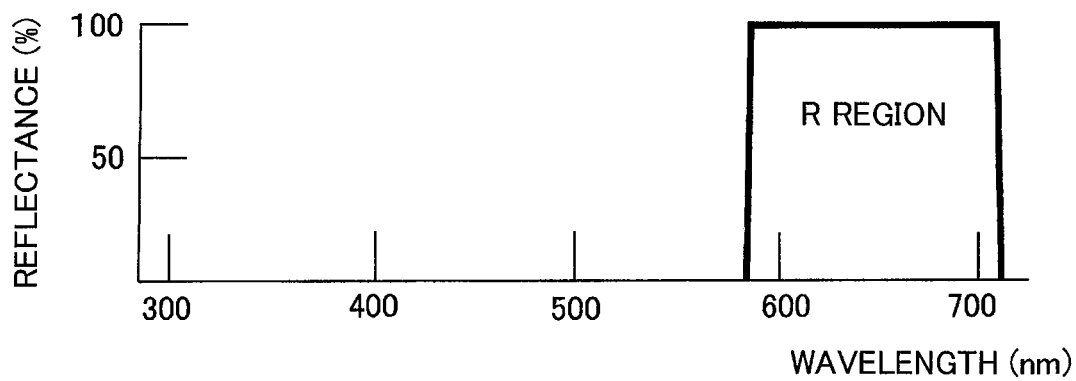

FIG. 4 is a diagram illustrating reflection characteristics of the wavelength selective optical planes 21. A G-light reflective plane reflects light having a wavelength in a G range and transmits light having other wavelength ranges. Similarly, a B-light reflective plane reflects light having a wavelength in a B range, and an R-light reflective plane reflects light having a wavelength in an R range.

An example of the light combining device 20 will be described. The light source cell 10a and the light source cell 10b are set to green light (G), the light source cell 10c is set to blue light (B), and the light source cell 10d is set to red light (R). In addition, the wavelength selective optical plane 21a is set to G-light reflection/B-light reflection/R-light transmission, the wavelength selective optical plane 21b is set to R-light reflection/B-light reflection/G-light transmission, the wavelength selective optical plane 21c is set to G-light reflection/R-light reflection/B-light transmission, and the wavelength selective optical plane 21d is set to B-light reflection/R-light reflection/G-light transmission. Therefore, in comparison with a case where reflective plane is provided to an inner surface of the light combining device 20, it is possible to obtain a unique effect of being capable of increasing approximately two times the number of times of multiple-reflection in the interior thereof.

Alternatively, if the reflection/transmission characteristics of the wavelength selective optical plane 21a are inverted, white light where R light, G light, and B light are combined can be extracted from the light-emitting surface 25.

Figure 5:
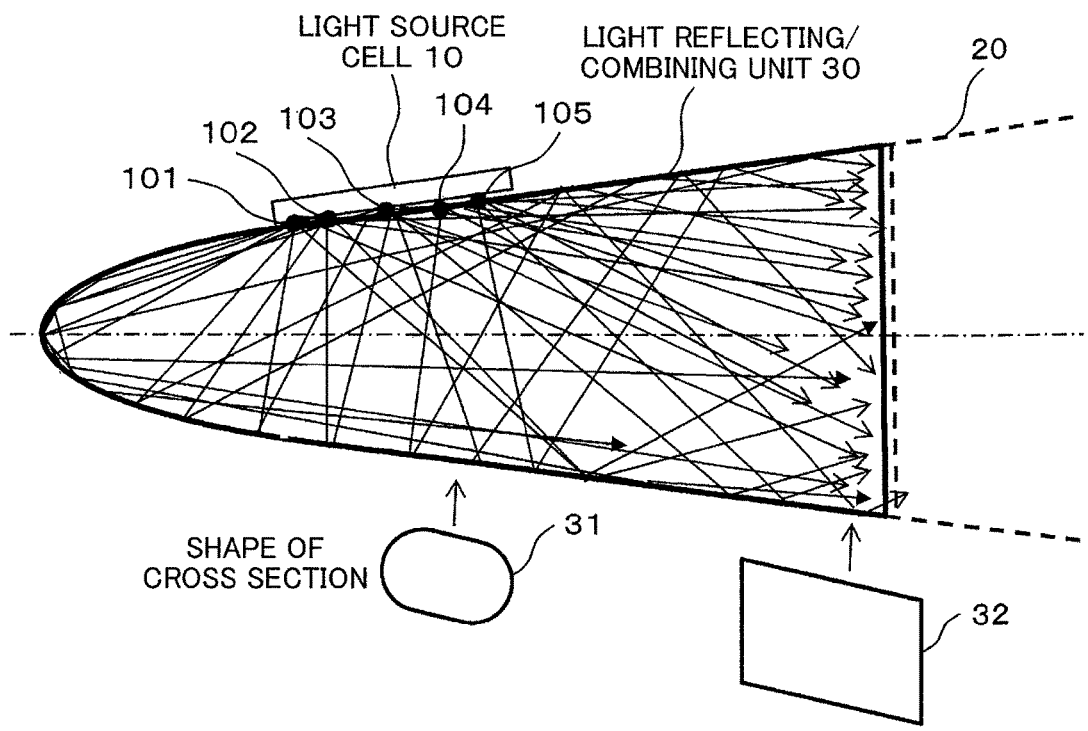
FIG. 5 is a cross-sectional diagram illustrating a configuration of a light reflecting/combining unit 30.

FIG. 5 is a cross-sectional diagram illustrating a configuration of the light reflecting/combining unit 30. The light reflecting/combining unit 30 has an overall substantially paraboloidal shape, and a cross-sectional shape along the emission direction is substantially parabolic. In addition, with respect to the shape of cross-section perpendicular to the emission direction, the shape in a central portion 31 is set to a substantially elliptical shape (or circular shape), and the shape at the jointing position 32 with respect to the light combining device 20 is set to a rectangular (or square), so that the shape of allowing the light reflecting/combining unit to be continuously connected to the light combining device 20 is obtained. The surface of the light reflecting/combining unit 30 is a reflective plane and reflects the light emitted from the light source cell 10 toward the direction of the light combining device 20.

FIG. 5 illustrates a propagation direction of the light emitted from light-emitting points 101 to 105 in the light reflecting/combining unit 30 in a case where the light source cells 10 are attached to the light reflecting/combining unit 30. The light reflecting/combining unit 30 is configured to have a substantially paraboloidal shape, and the light emitted from the light-emitting points 101 to 105 is repetitively reflected in the light reflecting/combining unit 30 to be combined, so that a uniform light flux is emitted to the light combining device 20.

Figure 6:
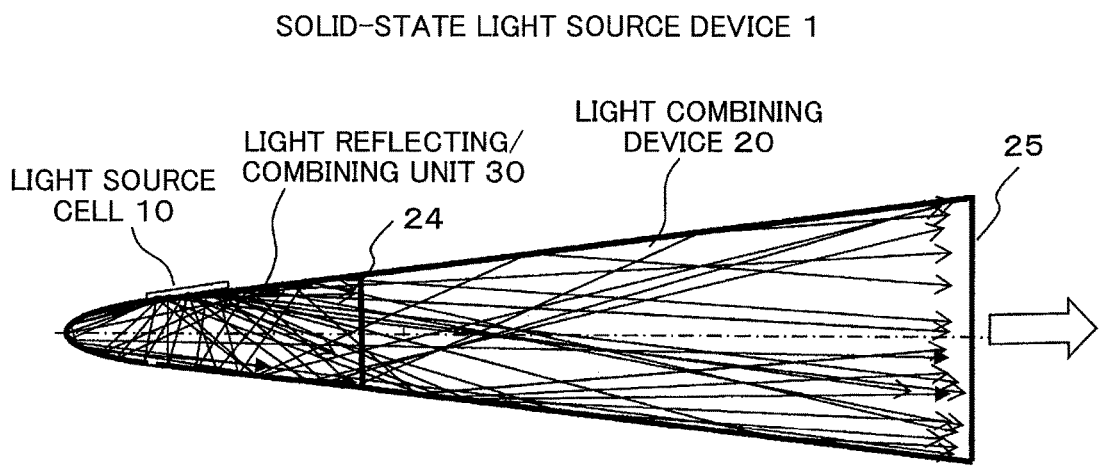
FIG. 6 is an entire light-ray diagram in the solid-state light source device.

FIG. 6 is an entire light-ray diagram in a solid-state light source device. In a case where the light source cells 10 are attached to the light reflecting/combining unit 30, a light flux incident from the light reflecting/combining unit 30 on the light combining device 20 is reflected by the surface of the light combining device 20 and is emitted from the light-emitting surface 25. At this time, by allowing the light to pass though the light combiners 20a to 20d constituting the light combining device 20, light of a specific wavelength is reflected by the wavelength selective optical planes 21a to 21d. Namely, in comparison with a case where light is reflected by only the reflective plane of the surface of the light combining device 20, by providing the wavelength selective optical planes 21a to 21d, the light use efficiency is improved. For example, in a case where a reflective film is an aluminum film, reflection loss (about 5% in one time of reflection) occurs. In contrast, if the wavelength selective optical planes 21a to 21d are used, the light which is not reflected but transmitted can be also used as the subsequent emitted light flux, the overall light use efficiency is not decreased.

In addition, the number of time of reflection in the light combining device 20 is increased, and thus, an intensity distribution of the emitted light flux can be allowed to be more uniform. In other words, in a case where a uniformity of the output light flux is allowed to be constant, the length of the light combining device 20 can be reduced. In addition, since the area of the light-emitting surface 25 is configured to be larger than the area of the incident side (jointing surface 24) of the light combining device 20, the angle of the emitted light beam approaches the optical axis direction, so that a directionality characteristic can be narrowed in a narrow region. In addition, in a case where the light source cells 10 are attached to the side surfaces of the light combining device 20, similarly, light beams are combined by the above-described function of the light reflecting/combining unit 30, and thus, the same effect can be also obtained.

According to the present invention, it is possible to implement a solid-state light source device having high light use efficiency and having a function of selectively extracting light of a desired color.

Second Embodiment

Figure 7:
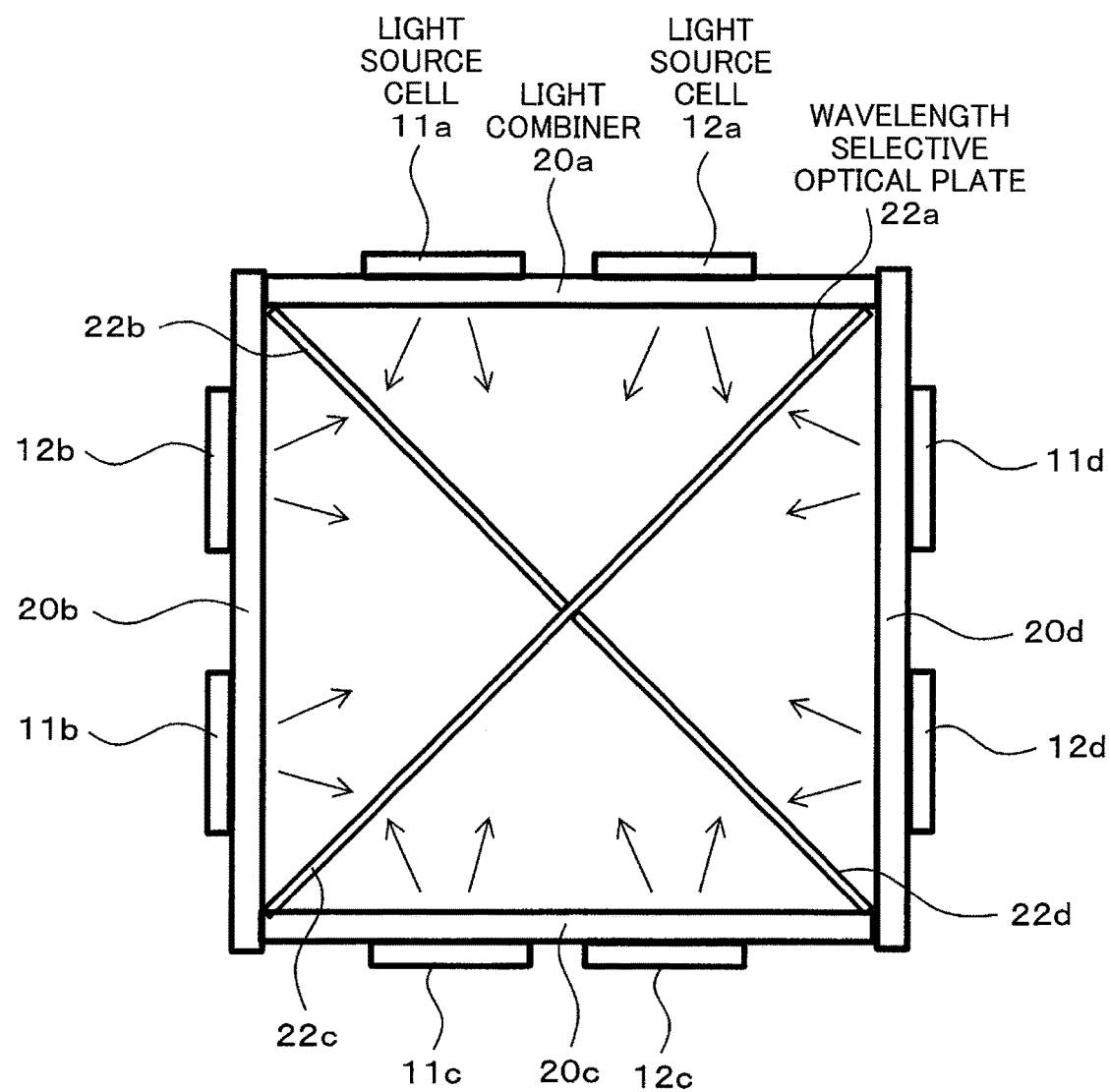
FIG. 7 is a cross-sectional diagram illustrating another configuration of a light combining device (second embodiment).

FIG. 7 is a cross-sectional diagram illustrating another configuration of a light combining device. In the light combining device 20' according to the embodiment, as light combiners 20a to 20d, wavelength selective optical plates 22a to 22d are arranged in a cross shape, and regions other than the wavelength selective optical plates 22a to 22d constitute an empty space (hollow structure). The characteristics of the wavelength selective optical plates 22a to 22d are the same as those of the wavelength selective optical planes 21a to 21d in FIG. 3B described above. In addition, a plurality (herein, two) of light source cells 11a, 12a, 11b, 12b, . . . are arranged for each of the light combiners 20a to 20d. Since the light combining device 20' of the embodiment has a hollow structure, a light-weighted device can be implemented, and the embodiment is very suitable for a large-sized solid-state light source device where a large number of light source cells are arranged.

Third Embodiment

Figure 8:
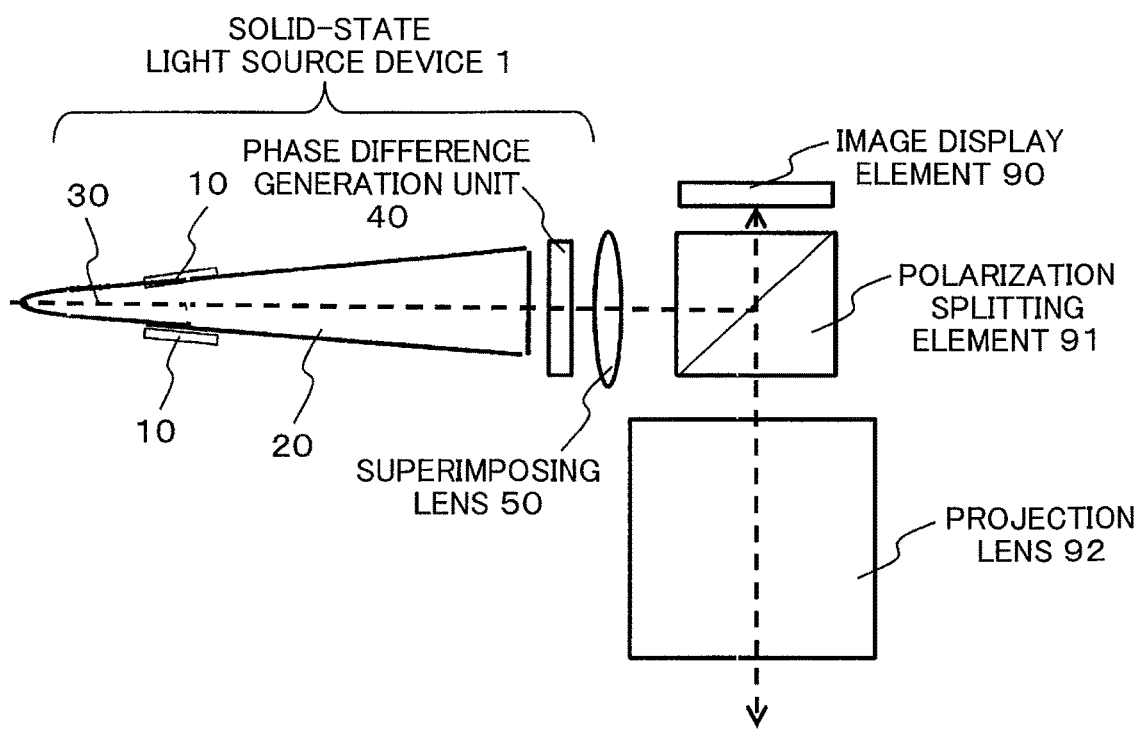
FIG. 8 is a diagram illustrating an example of an image projection apparatus using a solid-state light source device (third embodiment).

FIG. 8 is a diagram illustrating an example of an image projection apparatus using a solid-state light source device according to the present invention. The image projection apparatus 2 is configured by assembling an image display element 90, a polarization splitting element 91, and a projection lens 92 with the above-described solid-state light source device 1. The image display element 90 is, for example, a liquid crystal display panel of displaying an image, and the polarization splitting element 91 is an element of switching reflection and transmission according to a polarization state of incident light.

In the solid-state light source device 1, a phase difference generation unit 40 and a superimposing lens 50 are provided to the light-emitting surface side of the light combining device 20. The phase difference generation unit 40 changes a polarization state of emitted light, and the superimposing lens 50 allows an optical image to be coincident with the image display element 90. In addition, the superimposing lens 50 may be also omitted.

The polarized light emitted from the solid-state light source device 1 is reflected by the polarization splitting element 91 to be irradiated on the image display element 90, so that image light is generated. The image light transmits through the polarization splitting element 91 to be enlarged and projected on a screen or the like by the projection lens 92.

Figure 9:
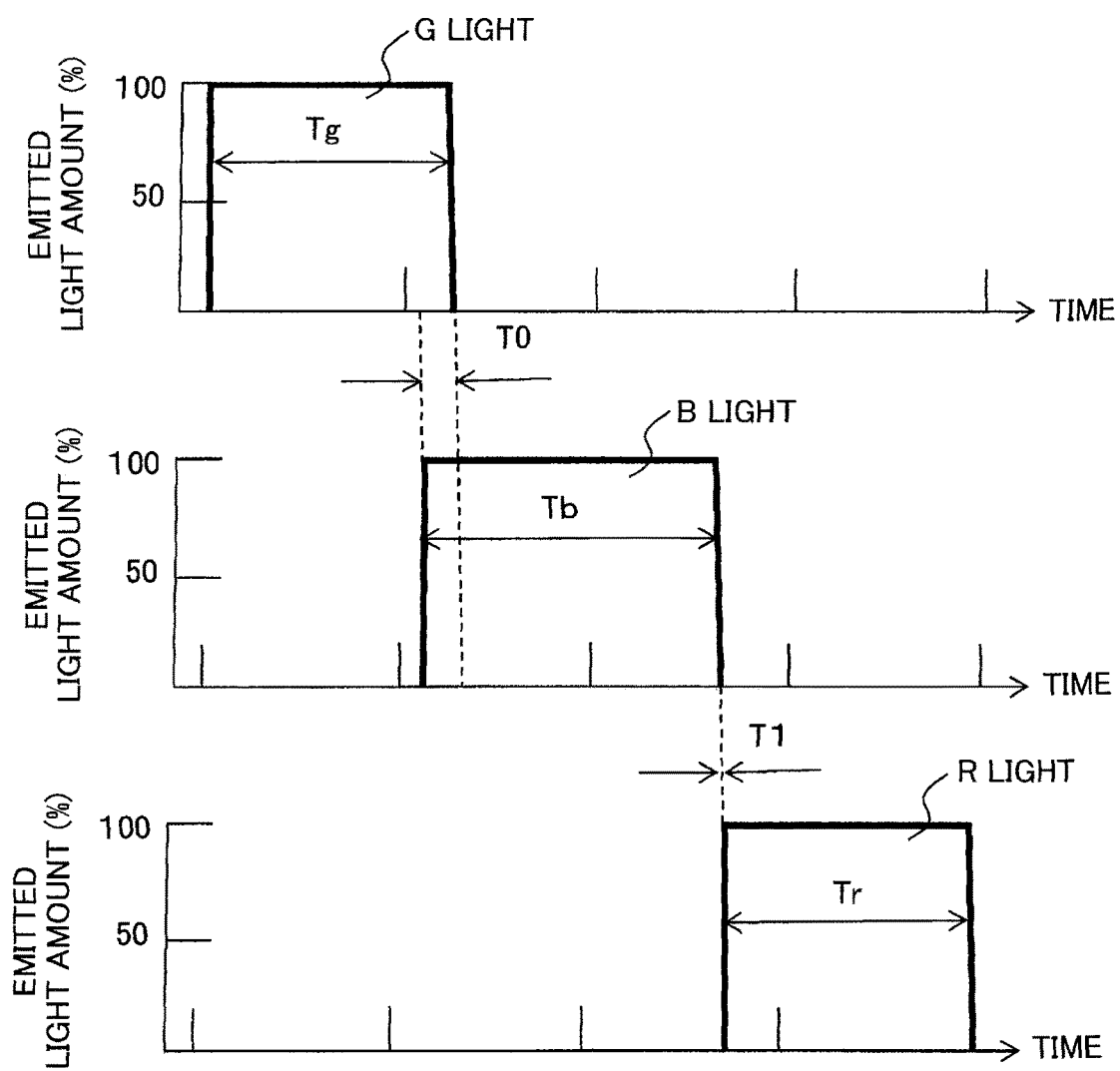
FIG. 9 is a diagram illustrating an example of a light-emitting timing of the solid-state light source device.

FIG. 9 is a diagram illustrating an example of a light-emitting timing of the solid-state light source device. The light source cells 10 of the solid-state light source device 1 are configured with elements of emitting light beams of different colors, for example, three colors of G light, B light, and R light. In addition, the light-emitting timing of each light source cell 10 is controlled in a time division manner. Therefore, the G light, the B light, and the R light are allowed to be emitted from the solid-state light source device 1 in a time division manner.

In addition, as illustrated in FIG. 9, light beams of two colors among the light beams of three primary colors are allowed to be simultaneously emitted, so that light of cyan, magenta, yellow, or the like can be emitted (in the figure, the G light and the B light are allowed to be simultaneously emitted during a T0 period). In addition, if the light source cell itself is used for light of a color other the three primary colors, there is also the effect of implementing light of multiple types of colors.

If the above-described solid-state light source device is applied to the image projection apparatus 2 of FIG. 8, the image display element 90 is irradiated with the G light, the B light, and the R light in a time division manner as the irradiation light. In synchronization with the irradiation, images of the G, B, and R light components are displayed in a time division manner on the image display element 90. Therefore, the image light of the G light, the B light, and the R light is projected in a time division manner, so that color image displaying is performed. In addition, if the light source cells 10 for the G light, the B light, and the R light are allowed to simultaneously emit light, illumination of white light is performed, so that a black-and-white image can be displayed.

In the embodiment, the solid-state light source device having high light use efficiency and emitting uniform illumination light according to the present invention is used, so that it is possible to implement a bright, high-image-quality image projection apparatus.

Fourth Embodiment

Figure 10:
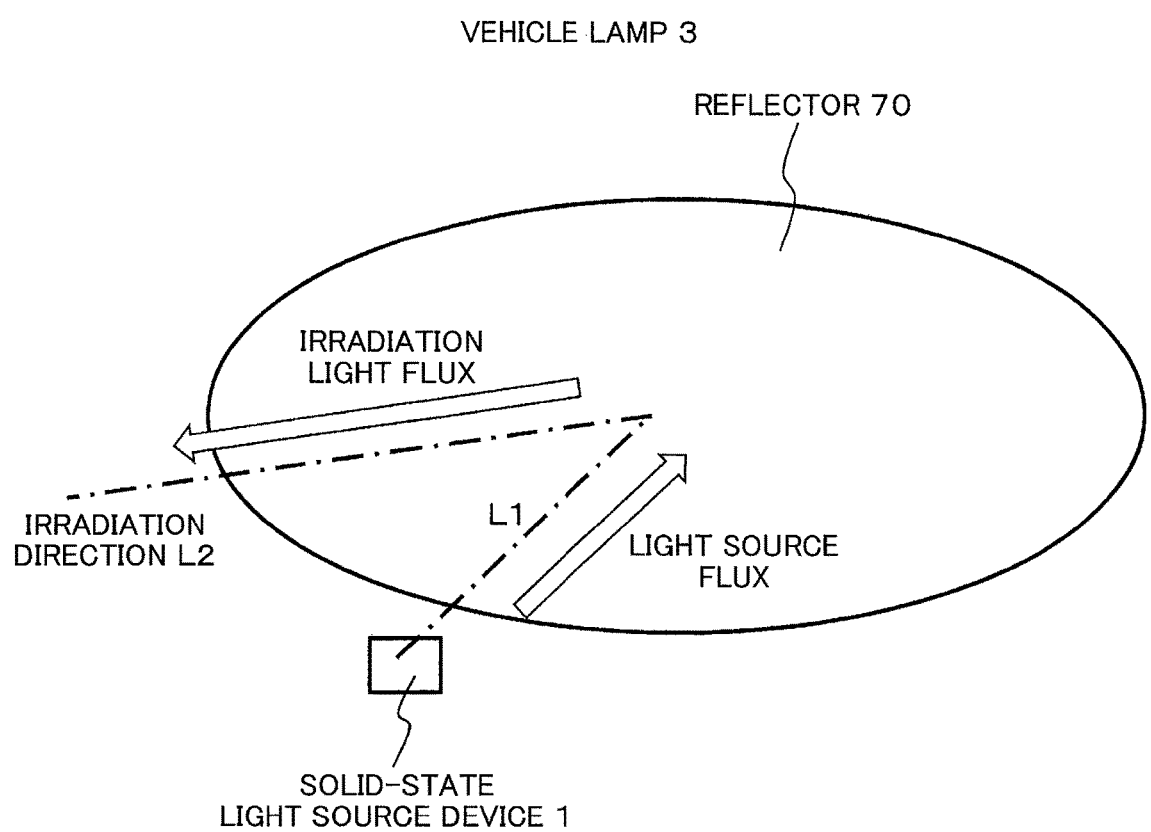
FIG. 10 is diagram illustrating an example of a vehicle lamp using a solid-state light source device (fourth embodiment).

FIG. 10 is a diagram illustrating an example of a vehicle lamp using the solid-state light source device according to the present invention. The vehicle lamp 3 reflects a light flux from the solid-state light source device 1 to a reflector 70 and irradiates the light flux in a predetermined direction. The light source flux from the solid-state light source device 1 is incident from the front inclined to the reflector 70 (optical axis L1), is reflected by the reflector 70, and is emitted toward the front as an irradiation light flux (optical axis L2). Therefore, it is preferable that the shape of the reflective plane of the reflector 70 is configured by selecting a free curved surface shape having a higher degree of freedom in design than a spherical surface or an aspherical surface symmetric with respect to the optical axes L1 and L2.

In the vehicle lamp according to the embodiment, the light from the light source cell is guided with a low loss, and the light of a desired wavelength can be reflected at a desired position on the reflector. Therefore, there is no limitation in position relationship between the light source and the lamp (exterior product), and a degree of freedom in light combination characteristic of irradiation light is greatly increased. In addition, since any pigment is not used to obtain desired color combination, there is no light absorption by pigments, and even in a case where external light (sun light) is incident on the lamp, there is no coloring in an exterior portion of the lamp by reflected light (transmitted light).

REFERENCE SIGNS LIST

1 Solid-state light source device
2 Image projection apparatus
3 Vehicle lamp
10, 10a to 10d, 11, 12 Light source cell
20 Light combining device
20a to 20d Light combiner
21a to 21d Wavelength selective optical plane
22a to 22d Wavelength selective optical plate
24 Jointing surface
25 Light-emitting surface
30 Light reflecting/combining unit

The invention claimed is:

1. A solid-state light source device using a solid-state light source as a light emitting body, comprising:
a plurality of light source cells configured with the solid-state light sources; and
a light combining device combining light emitted from the plurality of light source cells and emitting combined light,
wherein the light combining device has a plurality of reflective planes on a top, bottom and two side surfaces thereof, has a plurality of columnar-shaped regions divided along emission directions in an interior thereof, and has a plurality of wavelength selective reflective planes in interfaces between the columnar-shaped regions, and
wherein the plurality of light source cells are arranged on the top, bottom and two side surfaces of the light combining device.

2. The solid-state light source device according to claim 1, further comprising:
a light reflecting/combining unit reflecting the light emitted from the light source cells and emitting the light to the light combining device,
wherein the light reflecting/combining unit has a reflective plane on a surface thereof and is configured in a shape having an opening toward the light combining device.

3. The solid-state light source device according to claim 2, wherein the light reflecting/combining unit is configured in a substantially paraboloidal shape.

4. The solid-state light source device according to claim 1, wherein a dichroic prism where wavelength selective optical planes having dichroic characteristics are arranged in a cross shape in an interior thereof is used as the light combining device.

5. The solid-state light source device according to claim 1, wherein, as the light combining device, wavelength selective optical plates having dichroic characteristics are arranged in a cross shape in an interior thereof, and other regions are configured to be hollow.

6. The solid-state light source device according to claim 2,
wherein the plurality of light source cells are further arranged around the light reflecting/combining unit, and
wherein the light source cells emit light of different wavelengths in a time division manner.

7. The solid-state light source device according to claim 3,
wherein the plurality of light source cells are further arranged around the light reflecting/combining unit, and
wherein the light source cells emit light of different wavelengths in a time division manner.

* * * * *